United States Patent [19]

Furui

[11] Patent Number: 4,691,281

[45] Date of Patent: Sep. 1, 1987

[54] DATA PROCESSING SYSTEM SIMULTANEOUSLY CARRYING OUT ADDRESS TRANSLATION OF A PLURALITY OF LOGICAL ADDRESSES

[75] Inventor: Toshiyuki Furui, Tokyo, Japan

[73] Assignee: NEC Corporation, Tokyo, Japan

[21] Appl. No.: 599,869

[22] Filed: Apr. 13, 1984

[30] Foreign Application Priority Data

| Apr. 13, 1983 | [JP] | Japan | 58-64776 |
| Jul. 22, 1983 | [JP] | Japan | 58-132925 |
| Nov. 28, 1983 | [JP] | Japan | 58-223731 |
| Nov. 28, 1983 | [JP] | Japan | 58-223732 |

[51] Int. Cl.$^4$ .......................................... G06F 12/10
[52] U.S. Cl. ................................................. 364/200
[58] Field of Search ............... 364/200, 200 MS File, 364/900 MS File

[56] References Cited

U.S. PATENT DOCUMENTS

| 3,761,881 | 8/1973 | Anderson et al. | 364/200 |
| 4,195,342 | 3/1980 | Joyce et al. | 364/200 |
| 4,395,754 | 7/1983 | Feissel | 364/200 |

Primary Examiner—Archie E. Williams, Jr.
Assistant Examiner—David L. Clark
Attorney, Agent, or Firm—Sughrue, Mion, Zinn, Macpeak, and Seas

[57] ABSTRACT

In a data processing system for use in carrying out address translation of a preselected logical address so as to access a sequence of data elements stored in a memory (32) with an interval left between two adjacent ones of the data elements, a request control circuit (40) decides an element number in each cycle with reference to a logical distance (D) determined by the interval. The memory can be accessed in each cycle by a plurality of real addresses which are equal in number to the element number and which are calculated from the logical distance and the preselected logical address. Preferably, an address translation unit (80) is supplied with the preselected logical address and a part of the logical distance to produce a plurality of consecutive real page addresses (RPE and RPO) one of which corresponds to the preselected logical address. An address generator (50) produces a predetermined number of local logical addresses ($EA_0 \sim EA_3$) in response to the logical distance and the preselected logical address. The local logical addresses are combined with the consecutive real page addresses in an address combination circuit (100) to form local real addresses equal in number to the predetermined number. The local real addresses are restricted in number to the element number by a memory access controller (135) to be supplied to the memory as the real addresses.

5 Claims, 14 Drawing Figures

| CYCLE | T0 | T1 | T2 | T3 |
|---|---|---|---|---|
| 36 | B | B+4D | B+8D | B+12D |
| 37 | D (≈2²⁰/3) | | | |
| 73 | 4D | | | |
| NB | 4 | 4 | 4 | 4 |
| 101 | | R(C) | R(C+2) | R(C+4) |
| 102 | | R(C+1) | R(C+1) | R(C+3) |
| 106 | B / C | B+4D / C+1 | B+8D / C+3 | |
| 107 | B+D / C | B+5D / C+2 | B+9D / C+3 | |
| 108 | B+2D / C+1 | B+6D / C+2 | B+10D / C+3 | |
| 109 | B+3D / C+1 | B+7D / C+2 | B+11D / C+4 | |
| 116 | | R(C) | R(C+1) | R(C+3) |
| 117 | | R(C) | R(C+2) | R(C+3) |
| 118 | | R(C+1) | R(C+2) | R(C+4) |
| 119 | | R(C+1) | R(C+2) | R(C+4) |

(B)

| CYCLE | T0 | T1 | T2 | T3 |
|---|---|---|---|---|
| 36 | B | B+3D | B+6D | B+9D |
| 37 | D (≈2²⁰/2) | | | |
| 73 | 3D | | | |
| NB | 3 | 3 | 3 | 3 |
| 101 | | R(C) | R(C+2) | R(C+4) |
| 102 | | R(C+1) | R(C+1) | R(C-3) |
| 106 | B / C | B+3D / C+1 | B+6D / C+3 | |
| 107 | B+D / C | B+4D / C+2 | B+7D / C+3 | |
| 108 | B+2D / C+1 | B+5D / C+2 | B+8D / C+4 | |
| 109 | ( B+3D / C+1 | B+6D / C+3 | B+9D / C+4 ) | |
| 116 | | R(C) | R(C+1) | R(C-3) |
| 117 | | R(C) | R(C+2) | R(C+3) |
| 118 | | R(C+1) | R(C+2) | R(C+4) |
| 119 | | ( R(C+1) | R(C+1) | R(C+4) ) |

FIG. 12

| LP(8-9) | K | D(0)=0 | | | | D(0)=1 | | | |
|---|---|---|---|---|---|---|---|---|---|
| | | 4K | 4K+1 | 4K+2 | 4K+3 | 4K | 4K+1 | 4K+2 | 4K+3 |
| 0 | -1 | | | | | | LP-3 | LP-2 | LP-1 |
| | 0 | LP | LP+1 | LP+2 | LP+3 | LP | | | |
| | +1 | | | | | | | | |
| 1 | -1 | | | | | | | LP-3 | LP-2 |
| | 0 | | LP | LP+1 | LP+2 | LP-1 | LP | | |
| | +1 | LP+3 | | | | | | | |
| 2 | -1 | | | | | | | | LP-3 |
| | 0 | | | LP | LP+1 | LP-2 | LP-1 | LP | |
| | +1 | LP+2 | LP+3 | | | | | | |
| 3 | -1 | | | | | | | | |
| | 0 | | | | LP | LP-3 | LP-2 | LP-1 | LP |
| | +1 | LP+1 | LP+2 | LP+3 | | | | | |

DATA PROCESSING SYSTEM SIMULTANEOUSLY CARRYING OUT ADDRESS TRANSLATION OF A PLURALITY OF LOGICAL ADDRESSES

BACKGROUND OF THE INVENTION

This invention relates to a data processing system for use in processing a plurality of data arrays each of which consists of a great number of data elements.

Recently, a very high speed computer (so-called a super computer) has become indispensable to simulation in weather forecasting and nuclear engineering and to image processing for resource search and the like. Such a super computer should have a high speed in processing each data array, each data sequence consisting of a great number of data elements, such as vectors.

A conventional data processing system disclosed by S. R. Cray, Jr., U.S. Pat. No. 4,128,880 is operable as such a super computer for successively accessing each data array of vectors and comprises a plurality of vector registers coupled to a memory, a plurality of functional units cooperating with the vector registers, and a control unit for controlling the vector registers. Operation is mainly carried out between the vector registers and the functional units under control of the control unit, rather than between the memory and the vector registers. With this structure, it is possible to calculate or process the vectors at a high speed by the use of the vector registers when the vectors are memorized in the vector registers. However, the vectors are now always stored in the vector registers because each data array requires a great number of addresses.

Although the memory should inevitably be accessed in the absence of a data array in the vector registers, no suggestion is offered by the above-referenced patent. In the absence, throughput of the system is inevitably degraded and governed by throughput between the memory and the vector registers when the memory is accessed in a usual manner.

In order to raise the throughput, a virtual access method may be considered which carries out adress translation by the use of an address translation buffer. However, the address translation buffer should have a great capacity in order to deal with such a data array widely interspersed in the memory.

SUMMARY OF THE INVENTION

It is an object of this invention to provide a data processing system which is capable of accessing a memory at a high speed or high throughput.

It is another object of this invention to provide a data processing system of the type described, wherein address translation can be carried out at a high speed or high throughput.

It is a further object of this invention to provide a data procesing system of the type described, which can carry out address translation with a reduced amount of hardware.

A data processing system to which this invention is applicable is for use in accessing in each cycle a memory having a plurality of real addresses in a real address space for storing a plurality of sequences of data elements with the data elements of each sequence stored in those of the real addresses which are spaced apart by a real distance predetermined for each sequence. According to this invention, the data processing system comprises logical address specifying register for specifying a preselected one of logical addresses of a logical address space in each cycle that is associated with a preselected one of the data elements of each sequence, distance specifying register for specifying a logical distance associated with the real distance of each sequence in each cycle, a request control circuit responsive to the logical distance for deciding an element number for each sequence in each cycle, addres calculating circuitry responsive to the preselected logical address, the logical distance, and the element number for calculating specific addresses representative of those of the plurality of real addresses which are equal in number to the element number and spaced apart by the real distance associated with the logical distance and which include a preselected real address loaded with the preselected one of the data elements, the memory being accessed according to the specific addresses to produce those of the data elements of each sequence in each cycle which are equal in number to the element number and include the preselected one of the data elements.

BRIEF DESCRIPTION OF THE DRAWING

FIGS. 4A and 4B, show a time chart for use in describing operation of the data processing system illustrated in FIG. 2;

FIG. 9 shows a block diagram of a data processing system according to a second embodiment of this invention;

FIG. 12 shows a view for use in describing operation of the address translation unit illustrated in FIG. 11.

DESCRIPTION OF THE PREFERRED EMBODIMENTS

Figure 1:
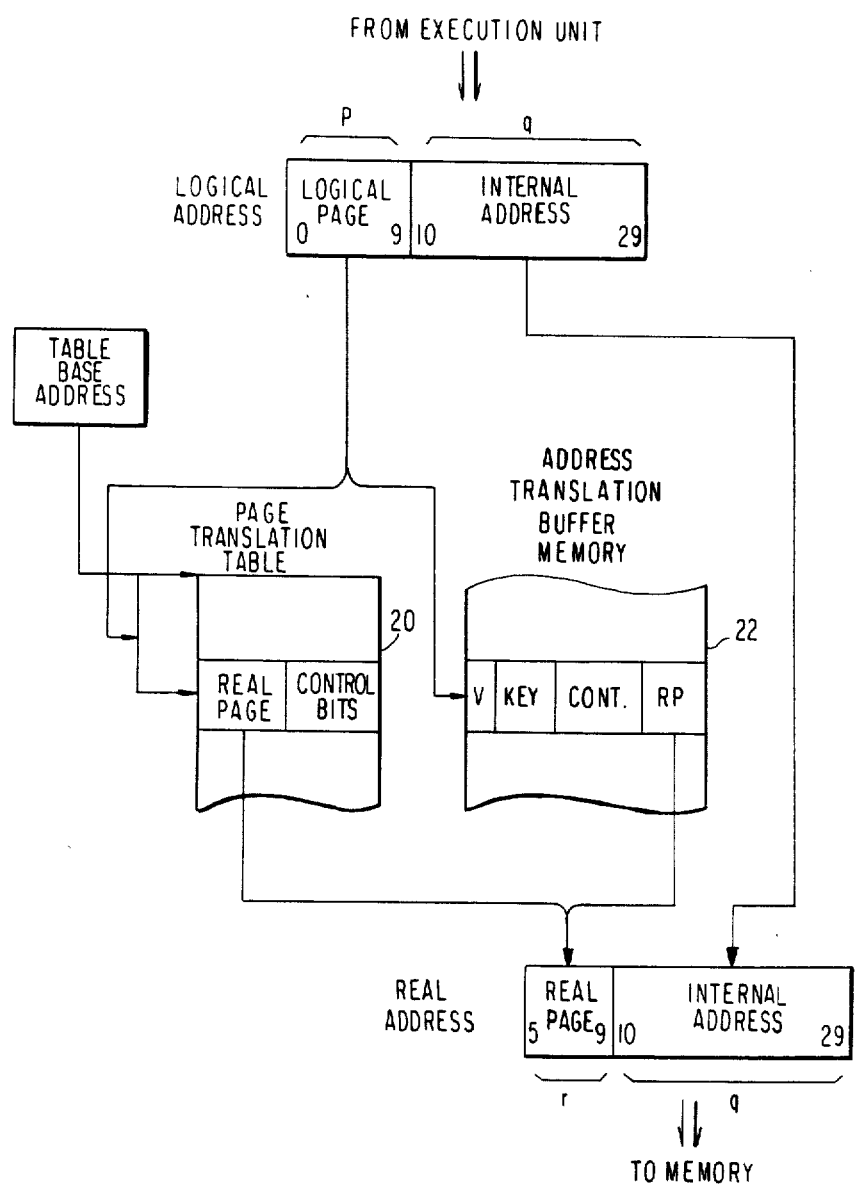
FIG. 1 shows a block diagram for use in describing operation of address translation carried out in this invention.

Referring to FIG. 1, description will be made as regards address translation for a better understanding of this invention. The address translation is for use in translating each logical address defined in a logical address space into a real address defined in a real address space, when a memory (not shown in this figure) is accessed by an execution unit, namely, a processor (not shown also).

The logical address space is divisible into a plurality of consecutively numbered logical pages with each logical page subdivided into a plurality of logical positions. Each logical address consists of a logical page address of p bits and a logical internal address of q bits. The logical page addresses specify the respective logical pages while the logical internal addresses, the respective logical positions of each logical page. Let p and q be equal to 10 and 20, respectively. In this event, the logical page addresses are specified by 10 bits which are arranged from a most significant bit, namely, a zeroth bit to ninth bit, as illustrated in FIG. 1. The number of the logical page addresses is therefore equal to 1024. Inasmuch as the logical internal addresses are specified by 20 bits which are arranged from a tenth bit to a twenty-ninth bit, namely, a least significant bit, each logical page is subdivided into the logical positions of $2^{20}$, namely, 1,048,576. If a single word is stored in each logical position, each logical page is loaded with the words of $2^{20}$ in number.

Likewise, the real address space is divisible into a plurality of consecutively numbered real pages with each real page subdivided into a plurality of memory locations. Each of the real addresses consists of a real page address of r bits and a real internal address. The real page addresses are for accessing the respective real pages while the real internal addresses, the respective memory locations of each real page. Each real internal address is common to each logical internal address and is therefore specified by 20 bits in the example being illustrated. Therefore, each internal real address may simply be called an internal address. Thus, each real page is loaded with the words of $2^{20}$ in number, like each logical page. However, the real page addresses are smaller in number than the logical page addresses. Let the real page addresses be equal to 32. Therefore, r is equal to 5. Thus, each real page address is specified by 5 bits which are arranged from the fifth bit to the ninth bit, as shown in FIG. 1.

Under the circumstances, the address translation should be made from each logical page address into one of the real page addresses.

Such address translation is carried out by the use of an address translation table 20 which is stored in the memory and which may be called a page translation table (PT). The page translation table has a table base address and a plurality of entries following the base address.

Let a particular one of the logical page addresses be produced together with a particular one of the internal addresses from the execution unit. Inasmuch as the particular logical page address specifies a particular one of the entries in relation to the table base address, in the manner known in the art, the particular entry is read out of the page translation table. As a result, a particular one of the real page addresses is derived from the particular entry along with control bits. The control bits will not be described in the instant specification because they are outside the scope of this invention. The particular real page address is concatenated to the particular logical internal address to form a particular real address comprising the particular real page address and a particular real internal address which is common to the particular logical internal address.

The memory should be accessed to derive the page translation table therefrom each time when address translation is carried out. Therefore, the address translation proceeds at a slow speed.

In order to carry out such address translation at a high speed, an address translation buffer memory 22 is used to store a copy of a whole or a part of the above-mentioned page translation table. The buffer memory 22 stores a plurality of entries each of which comprises a validity bit portion V, a key portion KEY, a control bit portion CONT, and a real page portion RP. The buffer memory 22 is accessed by a part of the particular logical page address in a known manner. The particular logical page address is therefore divided into the part for accessing the buffer memory 22 and the remaining part. It is assumed that the key portion of the particular entry is loaded with the remaining part of the particular logical page address and that the real page portion of the particular entry is loaded with the particular real page address. The buffer memory 22 is at first accessed by a part of the particular logical page address to specify a particular one of the entries. In this event, the particular real page address is read out of the real page portion of the particular entry, when the remaining part of the particular logical page address is coincident with that stored in the particular entry and the validity bit portion is loaded with a logic "1" level.

It is possible with this to carry out the address translation at a high speed if an entry in question is present in the buffer memory 22. If an entry in question is absent in the buffer memory 22, the memory itself is accessed by the particular logical page address to retrieve the page translation table in the manner mentioned before. As a result, an entry in question is read out of the memory to carry out address translation and is moved to the buffer memory 22 to be registered therein. An amount of data necessary for the 1024 logical pages can be processed in the above-mentioned operation by the use of the memory having a memory capacity for the real pages of 32.

Figure 2:
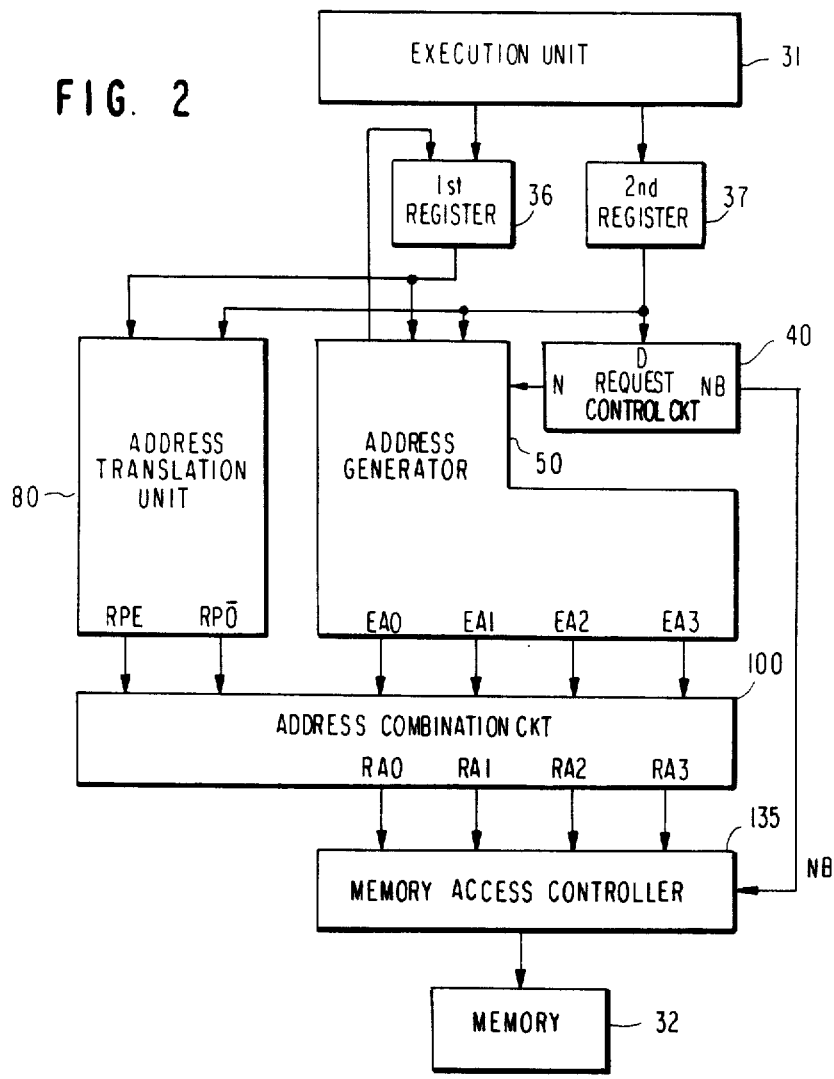
FIG. 2 shows a block diagram of a data processing system according to a first embodiment of this invention.

Referring to FIG. 2, a data processing system according to a first embodiment of this invention comprises an execution unit and a memory which are depicted at 31 and 32, respectively, and which are similar to those mentioned in conjunction with FIG. 1. The execution unit 31 successively carries out operations in cooperation with the memory 32 to process data in a well-known manner.

The illustrated memory 32 stores a plurality of data arrays or data sequences each of which consists oof a succession of data elements. Each sequence may represent, for example, a multi-dimensional vector. The data elements of each sequence are stored in those of the real addresses which are spaced apart or remote from one another by a distance predetermined for each sequence. In other words, the data elements of each sequence are arranged in the memory 32 with an interval equally spaced aprt from one another. Such a distance of each sequence may be different from that of the other sequence. The distance is defined in the real address space and may therefore be called a real distance.

Inasmuch as the real addresses consist of the real page addresses and the internal addresses as mentioned before, the data elements of each sequence can be accessed by indicating the real page addresses and the internal addresses. Each real distance is representative of the interval between two adjacent internal addresses assigned in the memory 32 to two adjacent ones of the data elements. It is possible to specify such a distance in the logical address space. The distance specified in the logical address space may be referred to as a logical distance.

Figure 3:
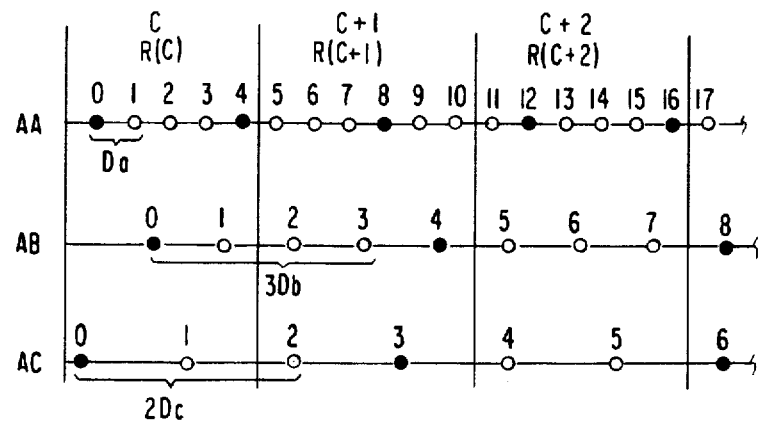
FIG. 3 shows a view for use in describing a relationship between logical and real pages on which data elements are spaced apart.

Temporarily referring to FIG. 3, a sequence AA has data elements arranged on consecutively numbered logical pages indicated at C, (C+1), . . . . The data elements of the sequence AA are spaced apart by a logical distance Da. It is assumed that two adjacent ones of the logical pages are simultaneously accessed in each cycle in a manner to be later described. An element number of the data elements which are simultaneously accessed in each cycle should be determined in consideration of the logical distance Da and the number of the logical internal addresses of each logical page. In the example being illustrated, the number of the logical internal addresses of each logical page is equal to $2^{20}$ as described in conjunction with FIG. 1. As shown in FIG. 3, four of the data elements of the sequence AA can simultaneously be accessed in each cycle because they are present within either a single logical page or two adjacent logical pages. In this case, zeroth, fourth, eighth, twelfth, and sixteenth ones of the data elements serve as leading or base data elements in the respective cycles. The remaining data elements can be accessed by indicating each logical address of the leading data elements and by adding the logical address of each leading data element to integral multiple of the real distance Da, 2Da, and 3Da. The integral multiples include a factor of unity. It will be assumed that address translation is effectively carried out between the logical and the real address spaces and that the logical pages C, (C+1), . . . are made to correspond to real pages R(C), R(C+1), . . . , respectively.

Inasmuch as the internal addresses of each real page is equal in number to that of each logical page, the real distance Da becomes equal to the logical distance.

In FIG. 3, a sequence AB has data elements spaced apart by a logical distance Db which is longer than the logical distance Da for the sequence AA. However, four data elements of the sequence AB can simultaneously be accessed like in the sequence AA because four consecutive data elements fall within two adjacent logical pages.

Anyway, the element number is equal to four when $$D \leq 2^{20}/3, \quad (1)$$

where D represents a general logical distance. The numerator of Formula (1) is representative of the number of the internal addresses of each logical page while the denominator thereof is equal to the element number less one.

A sequence AC has data elements spaced apart by a logical distance Dc which is longer than the distance Db. Four data elements of the sequence AC are interspersed in two consecutive pages. In this event, only three data elements of the sequence AC can concurrently be accessed because they fall within two adjacent pages. As is the case with Formula (1), access of three data elements of the sequence AC is specified by:

$$D \leq 2^{20}/2. \quad (2)$$

Referring back to FIG. 2, it will be presumed that the execution unit 31 carries out vector calculation by accessing each sequence. For this purpose, each logical address of the data elements of each sequence should be translated into a corresponding one of the real addresses in a manner to be described.

At first, the execution unit 31 produces a preselected one B of the logical addresses in each cycle that is associated with or indicates a preselected one of the data elements of each sequence. The preselected logical address B is for accessing each leading data element of each sequence in each cycle and consists of a preselected logical page address and a preselected logical internal address. In addition, the execution unit 31 produces a preselected logical distance D representative of the real distance of each sequence in each cycle. Production of the preselected logical address and the preselected logical distance can be possible in a usual manner. It is assumed that address translation is carried out as regards the sequence AB having the preselected logical distance specified by Formula (1).

Referring to FIG. 4(A) afresh and FIG. 2 again, the preselected logical address B and the preselected logical distance D are kept in first and second registers 36 and 37 in a first one of the cycles that is depicted at $T_0$ in FIG. 4(A). As a result, the preselected logical address B and the preselected logical distance D are specified by the first and the second registers 36 and 37 in the zeroth cycle $T_0$, respectively.

Figure 5:
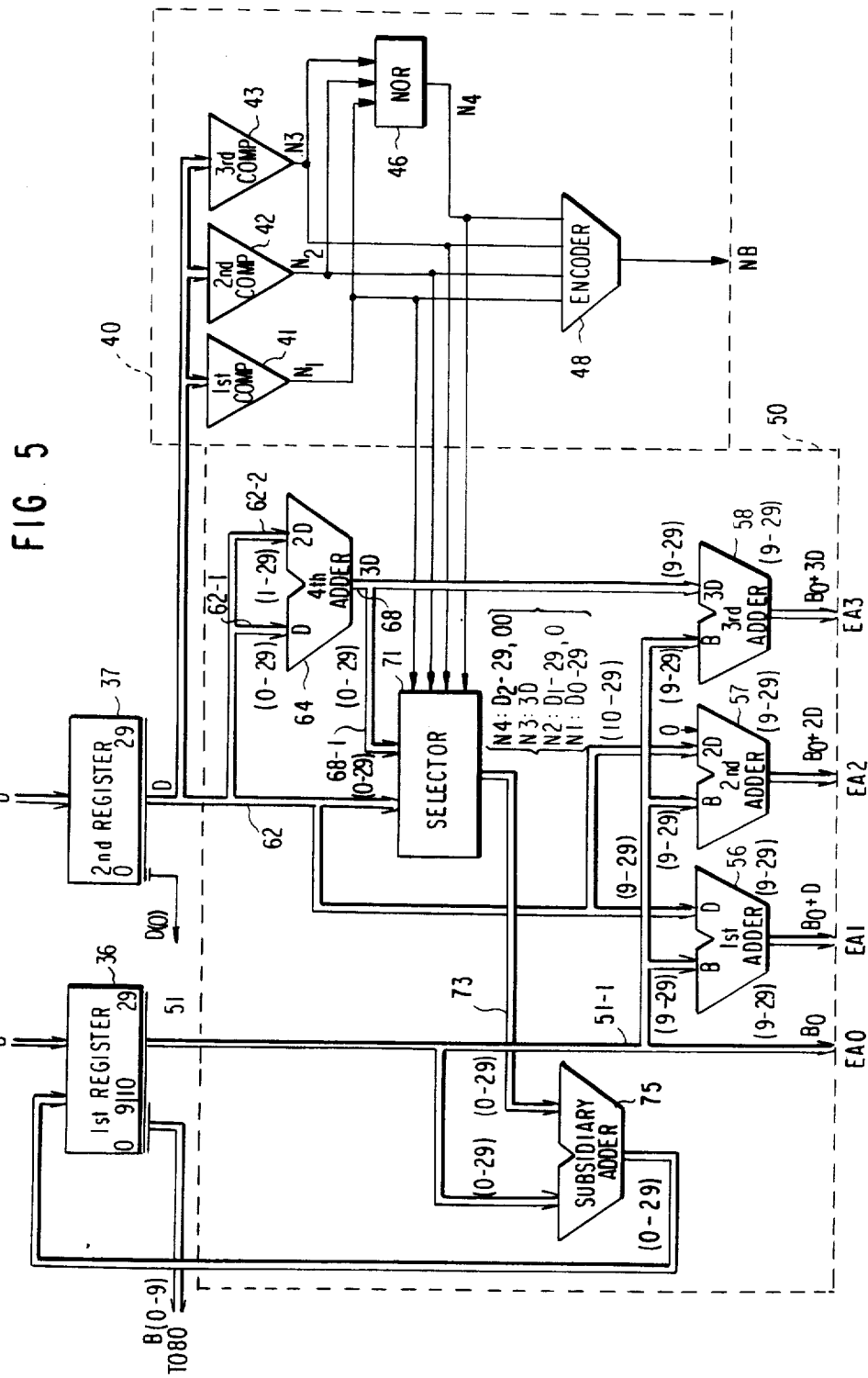
FIG. 5 shows a block diagram of an address generator and a request control circuit for use in the data processing system illustrated in FIG. 2.

Referring to FIG. 5 together with FIG. 2, the preselected logical distance D is sent to a request control circuit 40. The preselected logical distance D consists of thirty bits from a zeroth bit or a most significant bit to a twenty-ninth bit, as shown in FIG. 5, and is given in the form of a two's complement. The most significant bit $D_{(0)}$ specifies either a plus or a minus sign. When the most significant bit $D_{(0)}$ takes the logic "0" level, the preselected logical distance D is positive and, otherwise, the preselected logical distance D is negative.

The request control circuit 40 decides the element number, i.e., the aggregate number of data elements, for each sequence in response to the preselected logical distance D supplied from the second register 37 in each cycle. In other words, the aggregate number of data elements to be read out of the memory 32 is determined as the element number by the request control circuit 40 with reference to the preselected logical distance in the above-mentioned manner. More particularly, the request control circuit 40 comprises first, second, and third comparators 41, 42, and 43 supplied with the preselected logical distance D. The first comparator 41 serves to check whether or not four data elements can concurrently be accessed in each cycle. To this end, the first comparator 41 compares the preselected logical distance D with a first threshold value of $2^{20}/3$ ($\approx 344,064 = 2^{18} + 2^{16} + 2^{14}$). It is readily possible to give such a first threshold value to the first comparator 41. This operation of the first comparator 41 corresponds to Formula (1). If the preselected logical distance D is equal to $2^{20}/3$ or less, the first comparator 41 produces the logical "1" level as a first number signal $N_1$ indicative of the fact that four data elements can be accessed.

Likewise, the second and the third comparators 42 and 43 serve to check whether three and two data elements of each sequence can simultaneously be accessed in each cycle, respectively. Specifically, the second comparator 42 detects whether the preselected logical distance D is greater than the first threshold value of $2^{20}/3$ and is not smaller than a second threshold value of $2^{20}/2$ ($=2^{19}=524,288$). The second comparator 42 produces the logical "1" level as a second number signal $N_2$ indicative of the fact that three data elements can be accessed, when the preselected logical distance D is between the first and the second threshold values, the second threshold value inclusive. The operation of the second comparator 42 corresponds to Formula (2). The second comparator 42 can readily be implemented by combining a usual comparator circuit and a logic circuit.

The third comparator 43 detects whether the preselected logical distance D is greater than the second threshold value and is not smaller than a third threshold value of $2^{20}$ (=1,048,576). The third comparator 43 produces the logic "1" level as a third number signal $N_3$ indicative of the fact that the two data elements can be accessed when the preselected logical distance D is larger than the second threshold value of $2^{19}$ and is not smaller than the third threshold value. The third comparator 43 can be given in a manner similar to the second comparator 42.

When the preselected logical distance D is equal to zero or larger than the third threshold value of $2^{20}$, a single data element alone is accessed in each cycle. In this event, each of the first through the third comparators 41 to 43 supplies the logic "0" level to a NOR circuit 46. As a result, the NOR circuit 46 produces the logic "1" level as a fourth number signal $N_4$ indicative of the fact that a single data element alone can be accessed in each cycle.

The first through the fourth number signals $N_1$ to $N_4$ are selectively produced through an encoder 48 as an element number signal NB representative of the element number. The element number signal NB appears in the zeroth cycle $T_0$ as shown in FIG. 4(A). The first through the fourth number signals $N_1$ to $N_4$ are selectively sent to an address generator 50 as indicated at N in FIG. 2.

As shown in FIG. 2 and more particularly to FIG. 5, the address generator 50 is given the preselected logical address B and the preselected logical distance D from the first and the second registers 36 and 37, respectively. As mentioned before, the preselected logical address B consists of the preselected logical page address and the preselected logical internal address. In FIG. 5, the preselected logical page address is specified by ten bits from the most significant bit or the zeroth bit to the ninth bit while the preselected logical internal address is specified by twenty bits from the tenth bit to the twenty-ninth bit.

The address generator 50 is operable to calculate a predetermined number of local logical addresses which are spaced apart by integral multiples of the preselected logical distance D from the logical position specified by the preselected logical page address and the preselected logical internal address. In the illustrated address generator 50, the predetermined number is equal to four. In order to obtain the above-mentioned four local logical addresses, three of the integral multiplies of the preselected logical distance D which are represented by D, 2D, and 3D should be calculated in the address generator 50. The number of the integral multiple of the preselected logical distance D is equal to the predetermined number less one.

In the manner well known in the art, it is possible to attain two times the preselected logical distance D of thirty bits arranged from the zeroth bit to the twenty-ninth bit by substituting the first through the twenty-ninth bits of the preselected logical distance D for the zeroth through the twenty-eighth bits thereof and by giving the logic "0" level to the twenty-ninth bit. Likewise, four times the preselected logical distance D can be attained by shifting the second through the twenty-ninth bits by two bits into the zeroth through the twenty-seventh bits and by putting the twenty-eighth and the twenty-ninth bits into the logic "0" level. In addition, three times the preselected logical distance D can be calculated by adding the preselected logical distance D to two times the preselected logical distance D.

In FIG. 5, the address generator 50 comprises a first set of lines 51 through which the zeroth through the twenty-ninth bits of the preselected logical address are sent from the first register 36. Among the zeroth through the twenty-ninth bits, the ninth through the twenty-ninth bits are given through the first-set lines 51 to be produced through a subsidiary line set 51-1 for twenty-one bits as a first one of the four local logical addresses that is depicted at $EA_0$. The first local logical address $EA_0$ is common to the ninth through the twenty-ninth bits of the preselected logical address B. The first local logical address may completely be coincident with the preseleted logical address B kept in the first register 36. Anyway, the first local logical address $EA_0$ is coincident with at least a part of the preselected logical address B and may be depicted at $B_0$.

The first local logical address $EA_0$ is delivered through the subsidiary line set 51-1 to first, second, and third adders 56, 57, and 58 to calculate three of the remaining local logical addresses. Each of the first through the third adders 56 to 58 is of twenty-one bits. The first adder 56 is supplied through a second set of lines 62 with the ninth through the twenty-ninth bits of the preselected logical distance D from the second register 37. As a result, the first adder 56 adds the preselected logical distance D to the first local logical address $B_0$ to produce a second one of the local logical addresses that is depicted at $EA_1$. The second local logical address $EA_1$ is spaced apart by D from the first local logical address because it can be represented by $(B_0+D)$.

The tenth through the twenty-ninth bits of the preselected logical distance D are given to the zeroth through the ninteenth bits of the second adder 57 with the twentieth bit of the second adder 57 kept at the logic "0" level. Thus, the second adder 57 is supplied with two times the preselected logical distance 2D. Therefore, the second adder 57 carries out addition of the first local logical address $B_0$ to twice the preselected logical distance 2D to produce a third one of the local logical addresses $EA_2$ that is equal to $(B_0+2D)$.

Likewise, the third adder 58 adds three times the preselected logical distance 3D to the first local logical address $B_0$ to produce a fourth one of the local logical addresses $EA_3$ that is equal to $(B_0+3D)$. In order to calculate three times the preselected logical distance, a fourth adder 64 of 30 bits is connected between the second register 37 and the third adder 58. More specifically, the fourth adder 64 calculates three times the preselected logical distance 3D by adding the preselected logical distance D to twice the preselected logical address 2D. To this end, the zeroth through the twenty-ninth bits of the preselected logical distance D is sent through a first part 62-1 of the second-set lines 62 as the zeroth through the twenty-ninth bits of the fourth adder 64, respectively. On the other hand, the first through the twenty-ninth bits of the preselected logical address are supplied through a second part 62-2 of the second-set lines 62 to the fourth adder 64 as the zeroth through the twenty-eighth bits of the fourth adder 64 with the twenty-ninth bit kept at the logic "0" level. At any rate, the fourth adder 64 supplies three times the preselected logical distance 3D ot the third adder 58 through a third set of lines 68.

In FIG. 5, the illustrated address generator 50 comprises a selector 71 supplied with the first through the fourth number signals $N_1$ to $N_4$. The selector 71 is also supplied with the preselected logical distance D of 30 bits and three times the preselected logical distance 3D of 30 bits from the second register 37 and the fourth adder 64, respectively. The three times the preselected logical distance 3D is given through a first part 68-1 of the third-set lines 68.

The selector 71 selects one of the integral multiples of the preselected logical distance D in accordance with Table 1 to produce a selected multiple of 30 bits through a set of output lines 73 in the zeroth cycle $T_0$, as shown in FIG. 4.

TABLE 1

| $N_4$ | $N_3$ | $N_2$ | $N_1$ | Output lines 73 |
|---|---|---|---|---|
| 1 | 0 | 0 | 0 | D(0-29) = D × 1 |
| 0 | 1 | 0 | 0 | D(1-29), 0 = D × 2 |
| 0 | 0 | 1 | 0 | 68-1 = D × 3 |
| 0 | 0 | 0 | 1 | D(2-29), 0, 0 = D × 4 |

It is to be noted here that each sequence is successively processed in each cycle and that a leading or a preselected logical address to be processed in a cycle following a current one of the cycles should be determined in each cycle so as to carry out successive operation. The leading logical address in the following cycle is calculated in consideration of the first through the fourth number signals $N_1$ to $N_4$ supplied from the request control circuit 40. For example, when four data elements can be processed in the current cycle by production of the first number signal $N_1$ in the request control circuit 40, the following leading logical address in the following cycle is specified by adding four times 4D the preselected logical distance to the preselected logical address in the current cycle. Likewise, additions of 3D, 2D, and D to the preselected logical address in the current cycle should be made when the second through the fourth number signals $N_2$ to $N_4$ are produced by the request control circuit 40.

If the sequence AB (FIG. 3) is accessed which has the preselected logical distance D defined by Formula (1), the selector 71 produces 4D as the selected multiple in response to the first number signal $N_1$. The selected multiple is sent to a subsidiary adder 75 of 30 bits together with the preselected logical address B kept in the first register 36. The subsidiary adder 75 sums up the preselected logical address B and the selected multiple 4D to supply the first register 36 with the following leading logical address which is to be processed in the following cycle. The following leading logical address is kept in the first register 36 at the beginning of the following cycle. As to FIG. 4A, the following leading logical address is produced in the zeroth cycle $T_0$.

The preselected logical page address of 10 bits kept in the first register 36 is sent from the first register 36 to an address translation unit 80, as illustrated in FIGS. 2 and 5.

Figure 6:
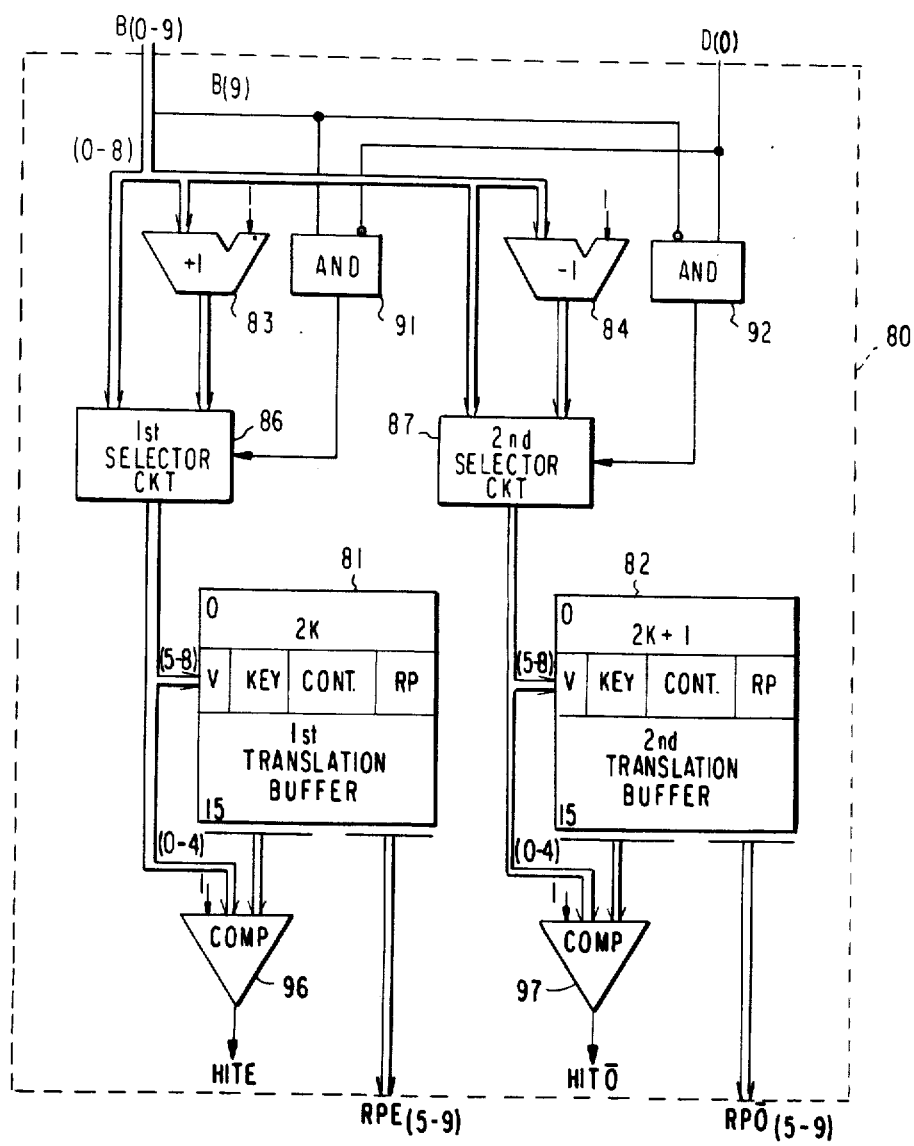
FIG. 6 shows a block diagram of an address translation unit for use in the data processing system illustrated in FIG. 2.

Referring to FIG. 6 together with FIG. 2, the address translation unit 80 produces two real page addresses $RPE_{(5-9)}$ and $RPO_{(5-9)}$ in response to the preselected logical page address indicated at $B_{(0-9)}$ (FIG. 5). The two real page addresses are for use in accessing two real pages consecutive to each other. Specifically, a first one (RPE) of the two real page addresses specifies a preselected one of the real pages of the memory 32 while a second one (RPO) of the two real page addresses, one of the real pages adjacent to the preselected real page. The adjacent real page is displaced from the preselected real page by either plus or minus one. The most significant bit, namely, the zeroth bit $D_{(0)}$ (FIG. 5) of the preselected logical distance D is given from the second register 37 to the address translation unit 80 so as to indicate whether the preselected logical distance D is positive or negative. This is because the zeroth bit of the preselected logical distance specifies either the positive or the negative distance, as mentioned in conjunction with the second register 37.

More specifically, the address translation unit 80 comprises first and second translation buffers 81 and 82 each of which is capable of being loaded with sixteen entries numbered from zero to fifteen. Inasmuch as the number of the logical pages is equal to 1024 in the illustrated system and both of the first and the second translation buffers 81 and 82 can be loaded with thirty-two entries, one thirty-second of the whole address translation table is mapped in the first and the second translation buffers 81 and 82. Such mapping is made by the use of a set associative method which is well known in the art.

Let the first translation buffer 81 be loaded with a part of the entries for an even number group of the logical page addresses which is specified by the logic "0" level of the ninth but, namely, the least significant bit of each logical page address and the second translation buffer 82 be loaded with a part of the entries for an odd number group of the logical page addresses which is specified by the logic "1" level of the least significant bit of each logical page address.

It is assumed that the least significant bit of the preselected logical page address $B_{(0-9)}$ has the logic "0" level and the most significant bit $D_{(0)}$ of the preselected logical distance takes the logic "0" level. The zeroth through the eighth bits of the preselected logical page address which may be referred to as nine higher bits, are delivered to first and second adder circuits 83 and 84 and to first and second selector circuits 86 and 87. The first adder circuit 83 carries out addition of unity to the nine higher bits of the preselected logical page address to produce a result of addition. On the other hand, the second adder circuit 84 carries out subtraction of unity from the nine higher bits to produce a result of subtraction.

The least significant bit $B_{(9)}$ of the preselected logical page address is sent to a first AND gate 91 which is supplied with the most significant bit $D_{(0)}$ of the preselected logical distance through an inverter. The least significant bit $B_{(9)}$ of the preselected logical page address is sent through another inverter to a second AND gate 92 which is supplied with the most significant bit $D_{(0)}$ of the preselected logical distance.

When each of the first and the second AND gates 91 and 92 produces the logic "0" level, each of the first and the second selector circuits 86 and 87 selects the nine higher bits. Otherwise, the first and the second selector circuits 86 and 87 select the result of addition and the result of subtraction, respectively.

Inasmuch as the least significant bit $B_{(9)}$ of the preselected logical page address takes the logic "0" level and the most significant bit $D_{(0)}$ of the preselected logical distance also takes the logic "0" level, the first selector 86 selects the nine higher bits. Similarly, the second selector 87 also selects the nine higher bits. Each of the first and the second translation buffers 81 and 82 carries out address translation in accordance with the nine higher bits in a manner to presently be described. Among the nine higher bits, five upper bits from the zeroth bit to the fourth bit are delivered to first and second comparison circuits 96 and 97 coupled to the first and the second translation buffers 81 and 82, respectively, while the four lower bits from the fifth bit to the eighth bit are delivered to the first and the second translation buffers 81 and 82 as a set address.

It should be recollected that the first and the second translation buffers 81 and 82 are loaded with the entries for the even and the odd number groups of the logical page addresses, respectively. For convenience of description, let the preselected logical page address be represented by LP.

In the above-mentioned example, the first and the second translation buffers 81 and 82 are commonly accessed by the four lower bits of the nine higher bits. However, those entries of the first and the second translation buffers 81 and 82 which are indicated by the four lower bits serve to carry out address translation of the even number group and the odd number group of the logical page addresses, respectively. Inasmuch as the preselected logical page LP is included in the even numer group in the example, the preselected logical page address is translated into the first real page $RPE_{(5-9)}$ by the first translation buffer 81 and the first comparison circuit 96. In this event, the adjacent logical page address represented by (LP+1) is translated into the second real address $RPO_{(5-9)}$ by the use of the second translation buffer 82 and the second comparison circuit 97.

When each of the first and the second translation buffers 81 and 82 is accessed by the four lower bits of the nine higher bits of the preselected logical page address, a validity bit V and a key section KEY of each indicated entry are read out of each of the first and the second translation buffers 81 and 82 to be sent to each of the first and the second comparison circuits 96 and 97. The validity bit and the key section KEY are compared with unity and the five upper bits of the nine higher bits of the preselected logical page address in each of the first and the second comparison circuits 96 and 97. When coincidence is detected, the first and the second comparison circuits 96 and 97 produce bit signals HITE and HITO representative of presence of the indicated entries, respectively. Simultaneously, the first and the second real page addresses RPE and RPO are read out of real page sections (RP) of the first and the second translation buffers 81 and 82, respectively.

Figure 7:
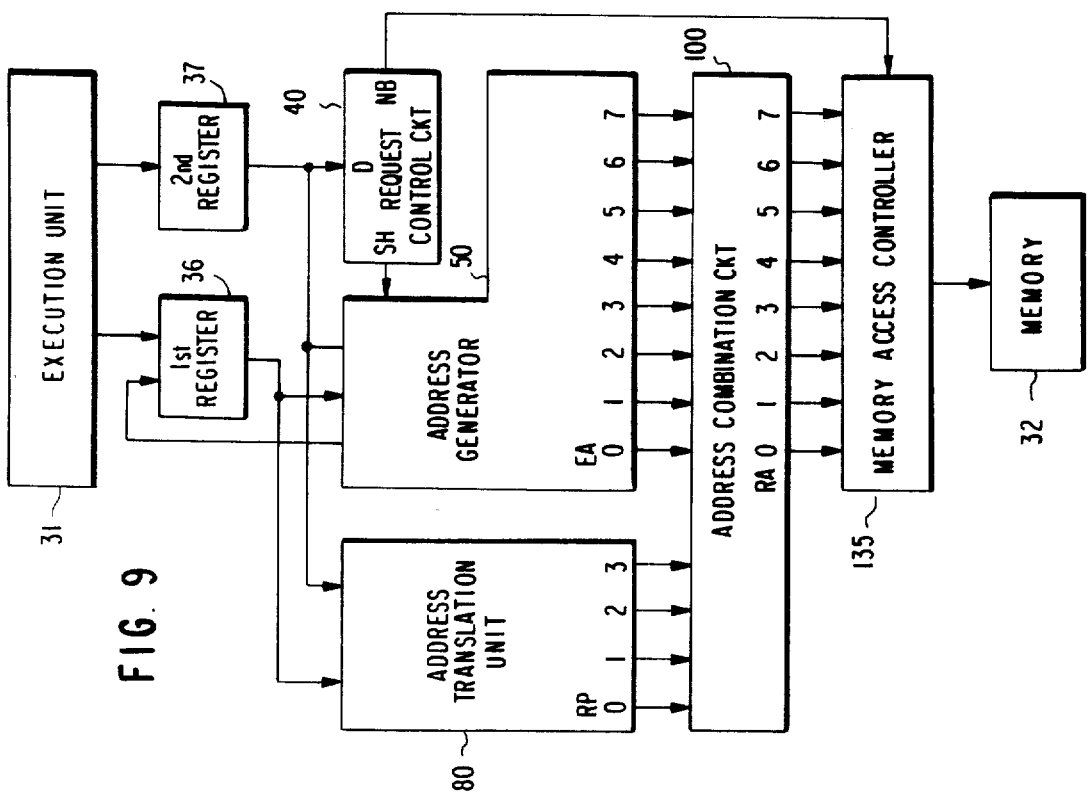
FIG. 7 shows a view for use in describing operation of the address translation unit illustrated in FIG. 6.

Referring to FIG. 7 together with FIG. 6, the first and the second translation buffers 81 and 82 carry out address translation of two logical page addresses represented by LP and (LP+1), as exemplified before, when the preselected logical page address LP is of an even number and the most significant bit $D_{(0)}$ takes the logical "0" level to indicate a positive logical distance ($D \geq 0$).

If the preselected logical page LP is specified by an odd number with the most significant bit $D_{(0)}$ kept at the logic "0" level, the first translation buffer 81 is accessed by the result of addition supplied from the first adder 83 with the second translation buffer 82 accessed by the four lower bits of the nine higher bits. Thus, the first and the second translation buffers 81 and 82 carry out address translation of (LP+1) and LP, respectively.

Anyway, two consecutive logical page addresses LP and (LP+1) are translated into two of the real page addresses as long as the most significant bit $D_{(0)}$ takes the logic "0" level.

When the most significant bit $D_0$ takes the logic "1" level on reception of the preselected logical page LP of an even number, two consecutive logical page addresses of LP and (LP−1) are translated into the first and the second real page addresses, respectively. In this case, the second translation buffer 82 is supplied with the result of subtraction as the nine higher bits.

Likewise, when the preselected logical page address LP is specified by an odd number with the most significant bit $D_{(0)}$ kept at the logic "1" level, the first and the second translation buffers 81 and 82 carry out address translation of two consecutive logical page addresses (LP−1) and LP, respectively.

Figure 8:
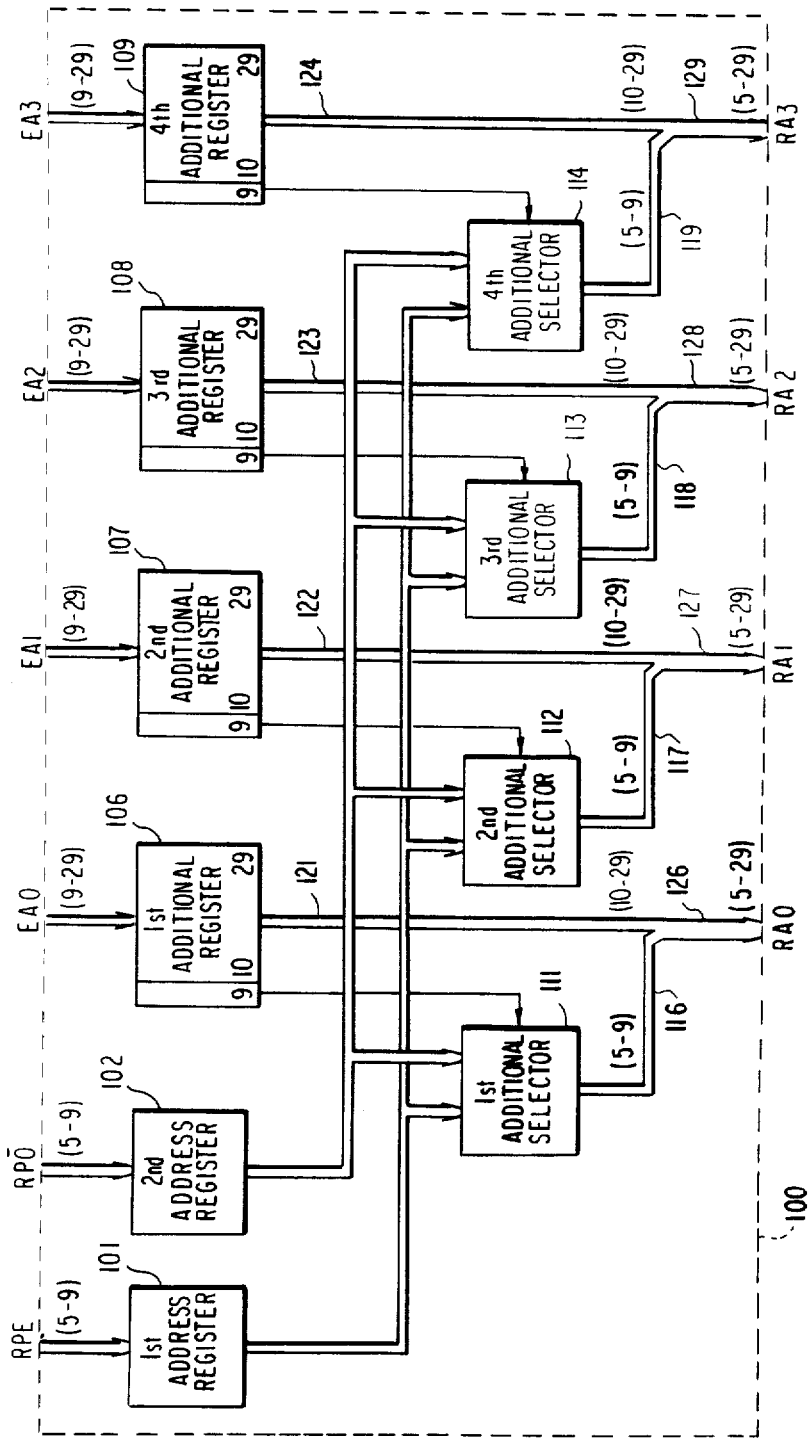
FIG. 8 shows a block diagram of an address combination circuit for use in the data processing system illustrated in FIG. 2.

Referring to FIG. 8 afresh and FIGS. 2 and 4 again, the first and the second real page addresses RPE and RPO are sent to an address combination circuit 100 together with the first through the fouth local logical addresses $EA_0$ to $EA_3$. Let the preselected logical page address LP be represented by C which is an even number. In addition, let the first and the second real page addresses RPE and RPO for the logical page addresses C and (C+1) be represented by R(C) and R(C+1), respectively.

In FIG. 8, the first and the second real page addresses R(C) and R(C+1) are kept in first and second address registers 101 and 102 in the first cycle $T_1$ (as shown in FIG. 4), respectively. Concurrently, the first through the fourth local logical addresses $EA_0$ to $EA_3$ each of which consists of 21 bits are kept in first through fourth additional registers 106, 107, 108, and 109, respectively (as shown in FIG. 4).

It is to be noted here that each most significant bit of the first through the fourth local logical addresses $EA_0$ to $EA_3$ is associated with the least significant bit of the preselected logical page address C and specifies either one of two consecutive logical pages. Therefore, each most significant bit of the first through the fourth local logical addresses $EA_0$ to $EA_3$ is indicated at 9. Let each most significant bit of the first and the second local logical addresses take the logic "0" level. On the other hand, let each most significant bit of the third and the fourth local logical addresses $EA_2$ and $EA_3$ take the logic "1" level. Under the circumstances, each of the first and the second local logical addresses $EA_0$ and $EA_1$ specifies an even number logical page address represented by C while each of the third and the fourth local logical addresses $EA_2$ and $EA_3$, an odd number logical page address represented by (C+1), as shown in FIG. 4(A).

In the first cycle $T_1$ illustrated in FIG. 4(A), the first and the second address registers 101 and 102 are loaded with the first and the second real page addresses R(C) and R(C+1), respectively, while the first through the fourth additional registers 106 to 109 are loaded with the first through the fourth local logical addresses $EA_0$ to $EA_3$ which are represented by twenty-one lower bits of B, (B+D), (B+2D), and (B+3D), respectively, and which are present in either C or (C+1).

The most significant bits of the first through the fourth local logical registers 106 to 109 are delivered to first, second, third, and fourth additional selectors 111 to 114, respectively. Each of the first through the fourth additional selectors 111 to 114 is coupled to the first and the second address registers 101 and 102 to select the first real page address R(C) and the second real page address R (C+1) when each most significant bit of the first through the fourth additional registers 106 to 109 takes the logic "0" level and the logic "1" level, respectively. In the example being illustrated, the first real page address R(C) is selected by the first and the second additional selectors 111 and 112 because the most significant bits of the first and the second local logical addresses $EA_0$ and $EA_1$ take the logic "0" level. On the other hand, the second real page address R(C+1) is selected by the third and the fourth additional selectors 113 and 114 because of the logic "1" level of each most significant bit of the third and the fourth local logical addresses $EA_2$ and $EA_3$.

Anyway, the first through the fourth additional selectors 111 to 114 send the selected real page addresses of five bits to first through fourth partial lines 116 to 119 which are combined with first through fourth additional partial lines 121 to 124 into first through fourth circuit output lines 126 to 129. In the example being illustrated, the first real page address R(C) appears on the first and the second partial lines 116 and 117 while the second real page address R(C+1), on the third and the fourth partial lines 118 and 119 in the first cycle $T_1$, as shown in FIG. 4(A).

The selected real page addresses are combined on the first through the fourth circuit output lines 126 to 129 with the first through the fourth local logical addresses from which the most significant bits are removed. The first through the fourth local logical addresses except for the most significant bits specify the logical internal addresses common to the real internal addresses. Accordingly, combinations of the selected real page addresses with the logical internal addresses may be sent through the first through the fourth circuit output lines 126 to 129 as the first through the fourth local real addresses $RA_0$ to $RA_3$, respectively.

Thus, the address combination circuit 100 serves to produce the first through the fourth local real addresses $RA_0$ to $RA_3$ equal in number to the first through the fourth local logical addresses $EA_0$ to $EA_3$, by combining the first and the second real page addresses RPE and RPO with the first through the fourth local logical addresses $EA_0$ to $EA_3$.

Turning back to FIG. 2, the first through the fourth local real addresses $RA_0$ to $RA_3$ are supplied to a memory access controller 135 together with the element number signal NB given from the request control circuit 40. When the element number signal NB is indicative of the fact that four data elements are accessible, all of the first through the fourth local real addresses $RA_0$ to $RA_3$ are selected by the memory access controller 135 to be simultaneously sent to the memory 32 as specific addresses.

From this fact, it is readily understood that a combination of the request control circuit 40, the address generator 50, the address translation unit 80, the address combination circuit 100, and the memory access controller 135 is operable to calculate the specific addresses representative of those of the real addresses which are equal in number to the element number.

When the memory 32 is accessed by the specific addresses, the data elements of each sequence are read out of the memory 32 in each cycle and are equal in number to the element number represented by the element number signal NB. The data elements read out of the memory 32 in each cycle include a preselected data element associated with the preselected logical address.

Referring to FIGS. 3 and 4(A) again, the data sequence AB illustrated in FIG. 3 is successively processed in the second and third cycles $T_2$ and $T_3$, as shown in FIG. 4(A). In the second cycle $T_2$, the first register 36 (FIG. 5) is loaded as the preselected logical address with a leading logical address, which is calculated in the first cycle $T_1$ and which is represented by (B+4D). Inasmuch as the leading logical address (B+4D) resides in the logical page address (C+1) of an odd number, the first and the second translation buffers 81 and 82 (FIG. 6) translate two consecutive logical page addresses (C+2) and (C+1) into real page addresses R(C+2) and R(C+1) to be kept in the first and the second address registers 101 and 102, respectively, as shown in FIG. 4. The address generator 50 generates four of the local logical addresses represented by (B+4D), (B+5D), (B+6D), and (B+7D) to be sent to the first through the fourth additional registers 106 to 109, respectively. As illustrated in FIG. 3, the leading logical address (B+4D) alone is present in the logical page (C+1) while the remaining logical addresses (B+5D), (B+6D), and (B+7D) are present in the logical page (C+2). Taking the above into consideration, the real page address R(C+1) is selected by the first additional selector 111 to be sent onto the first partial line 116 while the real page address R(C+2) are selected by each of the second through the fourth additional selectors 112 to 114 to be sent onto each of the second through the fourth partial lines 117 to 119, as illustrated in FIG. 4(A).

Similar operation is successively carried out as regards the data sequence AB illustrated in FIG. 3.

Let the data sequence AC illustrated in FIG. 3 be memorized in the memory 32 and be accessed. The logical distance D of the data sequence AC is shorter than $2^{19}$. The element number signal NB is therefore indicative of the fact that three data elements can be accessible in each cycle, as illustrated at NB in FIG. 4(B). The first through the fourth additional registers 106 to 109 are loaded with the first through the fourth local logical addresses $EA_0$ to $EA_3$ in each cycle. Likewise, the first through the fourth partial lines 116 to 119 are supplied with two real page addresses to be combined with the local logical addresses $EA_0$ to $EA_3$ into the first through the fourth local real addresses $RA_0$ to $RA_3$. However, the memory access controller 135 (FIG. 2) allows the first through the third local real addresses $RA_0$ to $RA_2$ to pass therethrough in response to the element number signal NB with the fourth local real address $RA_3$ suppressed. At any rate, the fourth local real address $RA_3$ is not supplied to the memory 32, as suggested in FIG. 4(B) by parentheses attached to 109 and 119.

Referring to FIG. 9, a data processing system according to a second embodiment of this invention is similar to that illustrated with reference to FIGS. 2 through 8 except that the address generator 50 generates eight local logical addresses indicated at $EA_0$ to $EA_7$, that the address translation unit 80 can translate four consecutive logical page addresses into four real page addresses depicted at $RP_0$ to $RP_3$ and that the address combination circuit 100 combines the four real page addresses $RP_0$ to $RP_3$ with the eight local logical addresses $EA_0$ to $EA_7$ to supply the memory access controller 135 with eight local real addresses depicted at $RA_0$ to $RA_7$. With this structure, it is possible to double the element number in each cycle and to triple the logical address space in comparison with the system illustrated in FIGS. 2 to 8, as will become clear as the description proceeds.

Figure 10:
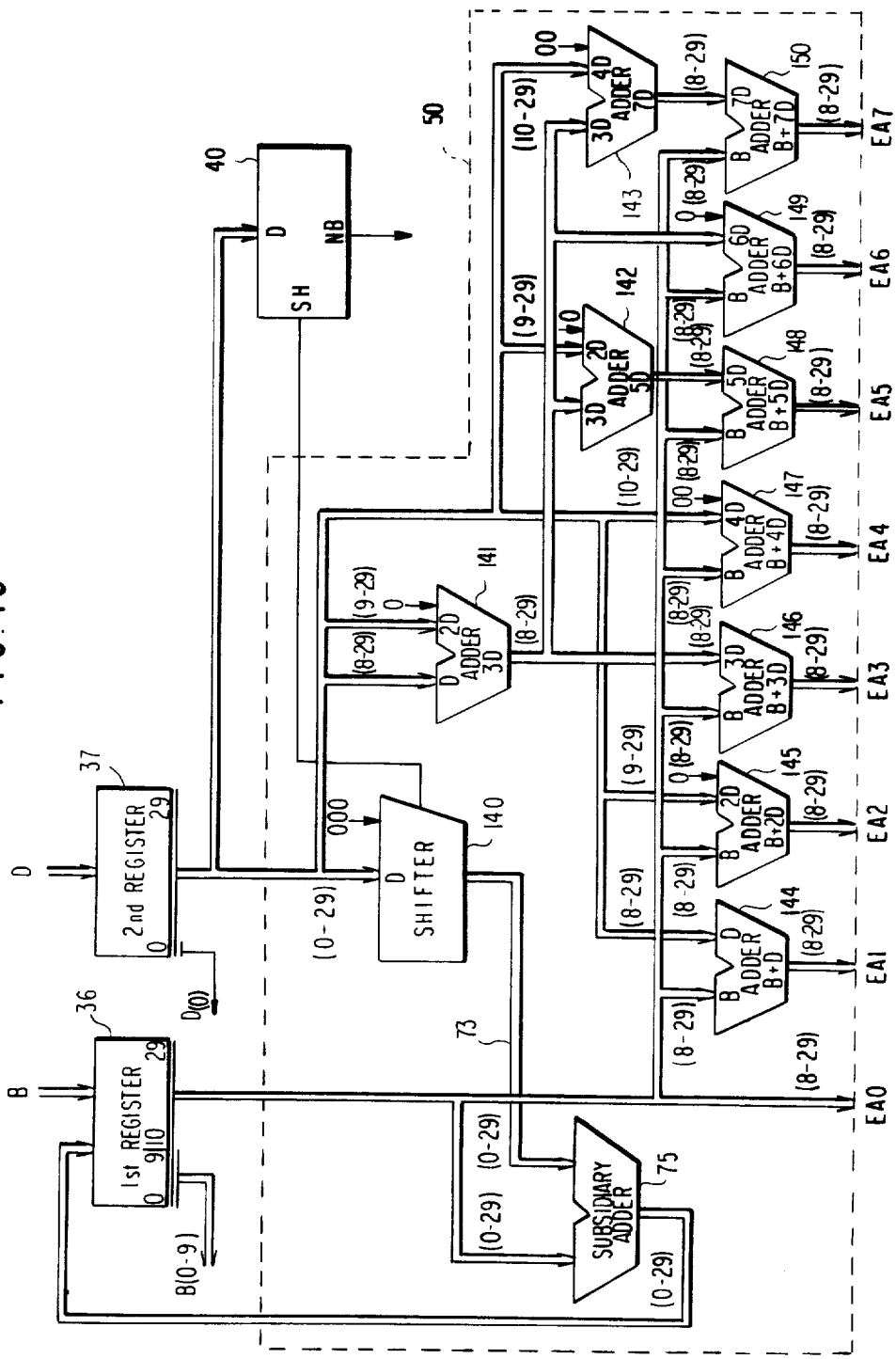
FIG. 10 shows a block diagram of an address generator for use in the data processing system illustrated in FIG. 9.

Referring to FIG. 10 together with FIG. 9, the illustrated request control circuit 40 is supplied with the preselected logical distance D from the second register 37 to produce the element number signal NB in each cycle. In addition, the request control circuit 40 produces a shift signal SH representative of an amount of shift. The shift signal SH serves to calculate a leading logical address in a cycle following each cycle, as will later be described. The leading logical address may be called a following leading logical address.

It should be mentioned here that simultaneous address translation is possible as regards four of consecutive logical page addresses. In other words, data elements to be simultaneously accessed should not be interspersed over four consecutive logical pages in this system. In addition, eight data elements of each sequence can be accessed at maximum in each cycle when they are present within four consecutive logical page addresses. Under the circumstances, the element number (NB) is determined in consideration of the preselected logical distance D kept in the second register 37. The amount of shift (SH) is decided in relation to the element number (NB) and the preselected logical distance D. For example, when the element number (NB) is equal to eight, the amount of shift (SH) should be 8D to specify the following leading logical address. Such an amount of 8D is achieved by shifting the preselected logical distance D by three bits upwards. When the element number (NB) is equal to four, the amount of shift (SH) should be 4D which can be obtained by shifting the preselected logical distance D by two bits. Anyway, the element number (NB) and the amount of shift (SH) are determined in accordance with Table 2.

TABLE 2

| D | SH | NB |
|---|---|---|
| $0 < |D| \leq (3 \times 2^{20})/7$ | 3 | 8 |
| $(3 \times 2^{20})/7 < |D| \leq 2^{20}$ | 2 | 4 |
| $2^{20} < |D| \leq 3 \times 2^{19}$ | 1 | 2 |
| $|D| > 3 \times 2^{19}$ or $|D| = 0$ | 0 | 1 |

As shown in Table 2, only four numbers (8, 4, 2, 1) are used as the element numbers (NB) with the remaining numbers (7, 6, 5, 3) unused. This is because integral multiples of the preselected logical distance D can readily be attained or calculated as regards the exemplified numbers (8, 4, 2, 1) in the address generator 50.

The shift signal SH is sent to a shifter 140 supplied with the preselected logical distance D. The shifter 140 calculates those integral multiples of the preselected logical distance D which are represented by 8D, 4D, 2D, and D. The calculated integral multiples are sent through the line 73 to the subsidiary adder 75 to be added to the preselected logical address B. As a result, the following leading logical address is sent from the subsidiary adder 75 towards the first register 36, like in FIG. 5.

The address generator 50 should produce first through eighth ones of the local logical addresses $EA_0$ to $EA_7$ for the eight data elements of each sequence. The first through the eighth local logical addresses $EA_0$ to $EA_7$ must be equal to $B(B+D)$, $(B+2D)$, ..., and $(B+7D)$. For this purpose, the address generator 50 comprises first through tenth local adders 141 to 150. The first through the third local adders 141 to 143 are for calculating 3D, 5D, and 7D. The fourth through the tenth local adders 144 to 150 are for adding D through 7D to the preselected logical address B to produce the second through the eighth local logical addresses $EA_1$ to $EA_7$, respectively. Each of the first through the eighth local logical addresses $EA_0$ to $EA_7$ can be specified by twenty-two lower bits of thirty bits for each logical address because the data elements to be accessed in each cycle should be present within four consecutive logical pages. In other words, the four consecutive logical pages can be specified by the use of the two lower bits of the logical page addresses. Therefore, the eight higher bits from the zeroth bit to the seventh bit are not used in the illustrated address generator 50.

Figure 11:
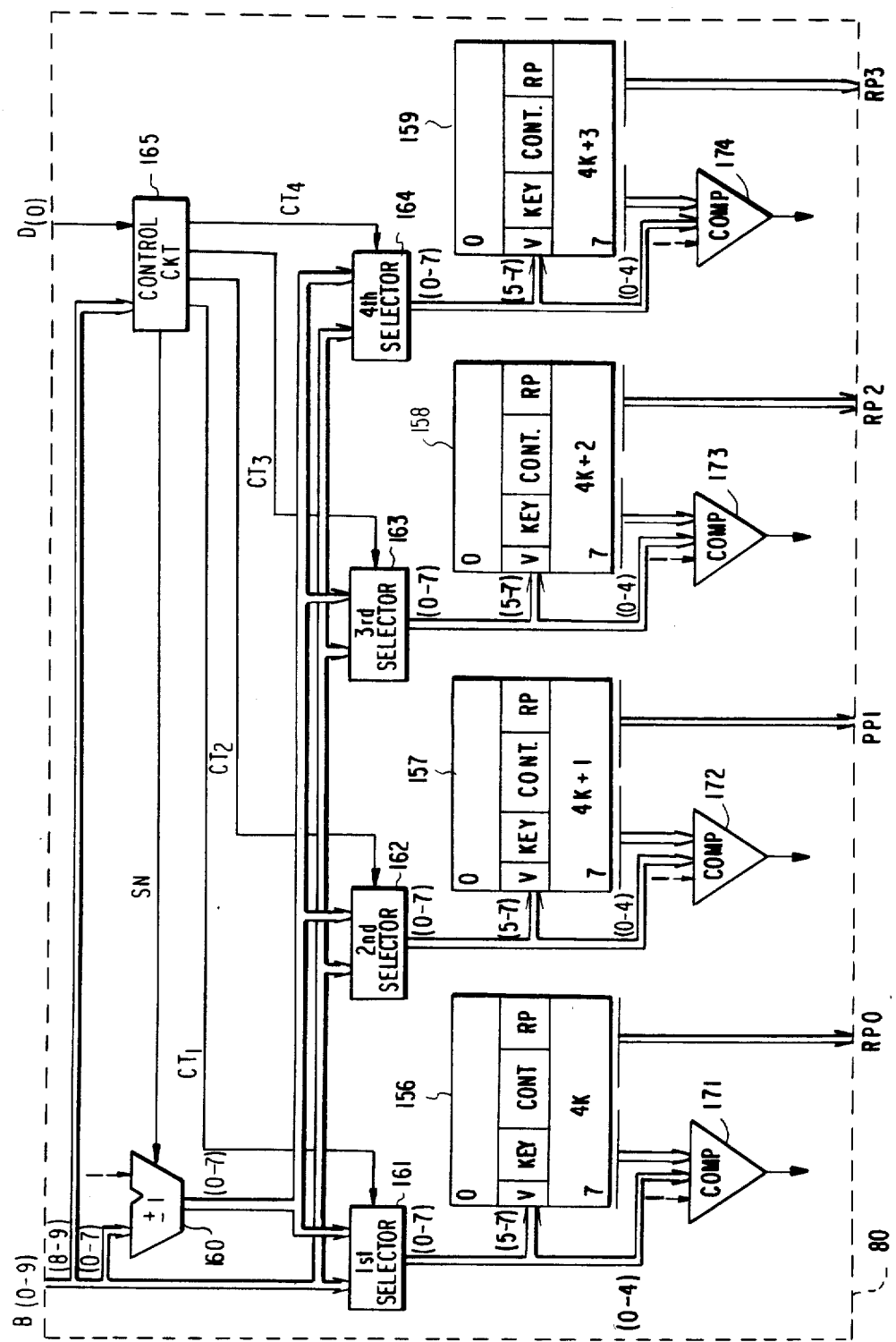
FIG. 11 shows a block diagram of an address translation unit for use in the data processing system illustrated in FIG. 9.

Referring to FIG. 11 together with FIG. 9, the illustrated address translation unit 80 is operable in response to the preselected logical page address $B_{(0-9)}$ of 10 bits and the most significant bit $D_{(0)}$ of the preselected logical distance D, like in FIG. 6. The address translation unit 80 comprises first through fourth translation buffers which are indicated at 156, 157, 158, and 159, respectively, and each of which is loaded with eight entries derived from the address translation table. Thus, thirty-two entries are stored in the whole of the first through the fourth translation buffers 156 to 159.

In the example being illustrated, the number of the logical pages is equal to 1024, like in the system described with reference to FIGS. 2 to 8. The logical pages can be specified by the logical page addresses of ten bits from the zeroth bit to the ninth bit. The logical pages of 1024 are divided into four groups. A first one of the four groups is represented by 4K where $K = 0 \sim 255$ while a second one of the four groups, $(4K + 1)$. Likewise, third and fourth ones of the groups are represented by $(4K + 2)$ and $(4K + 3)$, respectively. Each of the first through the fourth groups can be detected by monitoring a pair of the least significant bit and the least significant bit but one of each logical page address. Specifically, the first through the fourth groups are specified by "00," "01," "10," and "11" of the above-mentioned two bits, respectively.

The first through the fourth translation buffers 156 to 159 are loaded with the entries for the first through the fourth groups, respectively. The above allotment of the entries to the translation buffers 156 to 159 enables concurrent translation of four logical page addresses consecutive to one another in either a positive direction or a negative direction.

Among the preselected logical page address $B_{(0-9)}$, the eight higher bits from the zeroth bit to the seventh bit are delivered to an up-down counter 160 and to first through fourth selectors 161 to 164 while the eighth and the ninth bits are sent to a control circuit 165. The up-down counter 160 is controlled by the control circuit 165 to carry out addition of unity to the eight higher bits and subtraction of unity from the eight higher bits when the most significant bit $D_{(0)}$ of the preselected logical distance D takes the logic "0" level and the logic "1" level, respectively. This is because the most significant bit $D_{(0)}$ is supplied as a sign bit SN through the control circuit 165 to the up-down counter 160. Consequently, the up-down counter 160 supplies the first through the fourth selectors 161 to 164 with either a result of addition or a result of subtraction.

Each of the first through the fourth selectors 161 to 164 selects one of the eight higher bits of the preselected logical page address, the result of addition, and the result of subtraction under control of the control circuit 165, as will presently be clear. Inasmuch as the eight higher bits of the preselected logical page address corresponds to the number K($=0\sim255$) mentioned in conjunction with the entries kept in each translation buffer 156 to 159, output bits of each selector 161 to 164 are representative of one of K and (K+1).

The control circuit 165 delivers the first through the fourth selectors 161 to 164 with first through fourth control signals $CT_1$ to $CT_4$, respectively, in response to the most significant bit $D_{(0)}$ of the preselected logical distance D and the eighth and the ninth bits of the preselected logical page address.

From the above, it is readily understood that the ten bits of the preselected logical page address $B_{(0-9)}$ is divided into a higher significant part of M bits (namely, higher bits) and a lower significant part of N bits (namely, lower bits). In the illustrated example, M and N are equal to eight and two, respectively. As a result, the logical pages are divided into logical page blocks which are equal in number to two to the N-th power and each of which consists of the logical pages equal in number to two to the M-th power. The first through the fourth translation buffers 156 to 159, which are equal in number to two to the N-th power, are assigned to the respective logical page blocks. Each of the first through the fourth translation buffers 156 to 159 stores at least a part of each logical page block assigned thereto. A combination of the control circuit 165 and the first through the fourth selectors 161 to 164 serves to access the respective translation buffers 156 to 159 in accordance with a rule shown in FIG. 12 in response to the higher and the lower significant parts of the preselected logical page address.

Referring to FIG. 12 together with FIG. 11, description will be made as regards operation of the control circuit 165 and the first through the fourth selectors 161 to 164. Let the eighth and the ninth bits be indicative of 0 and the most significant bit $D_{(0)}$ take the logic "0" level because the preselected logical distance D is positive. In this event, each of the first through the fourth selectors 161 to 164 selects the eight higher bits (K) of the preselected logical page address. Inasmuch as the first through the fourth translation buffers 156 to 159 are loaded with the first through the fourth groups of the entries represented by 4K through (4K+3), four consecutive logical page addresses LP through (LP+3) are translated into first through fourth real page addresses $RP_0$ to $RP_3$ in the manner described in conjunction with FIG. 6, respectively, as shown in FIG. 12. Like in FIG. 6, first through fourth comparison circuit 171 to 174 are coupled to the first through the fourth selectors 161 to 164 and to the first through the fourth translation buffers 156 to 159, respectively.

In FIG. 12, let the eighth and the ninth bits of the preselected logical page address be representative of 2 and the most significant bit $D_0$ take the logic "0" level. Address translation of the preselected logical page address LP is carried out by the third translation buffer 158, as shown in FIG. 12. This means that the number K is selected by the third selector 163. Likewise, the fourth selector 159 selects K to make the fourth translation buffer 159 carry out address translation of (LP+1). On the other hand, the first and the second translation buffers 156 and 157 should be accessed by (K+1) so as to carry out address translation of (LP+2) and (LP+3), respectively, as readily understood from FIG. 12.

To this end, the control circuit 165 makes the up-down counter 160 carry out addition of unity. In addition, the control circuit 165 delivers the logic "1" level as each of the first and the second control signals $CT_1$ and $CT_2$ to the first and the second selectors 161 and 162 to make the first and the second selectors 161 and 162 select the results (K+1) of addition. Simultaneously, the control circuit 165 delivers the logic "0" level as each of the third and the fourth control signals $CT_3$ and $CT_4$ to the third and the fourth selectors 163 and 164 to make the third and the fourth selectors 163 and 164 select K. Thus, the address translation unit 80 simultaneously produces the first through the fourth real page addresses $RP_0$ to $RP_3$ consecutive to one another.

Figure 13:
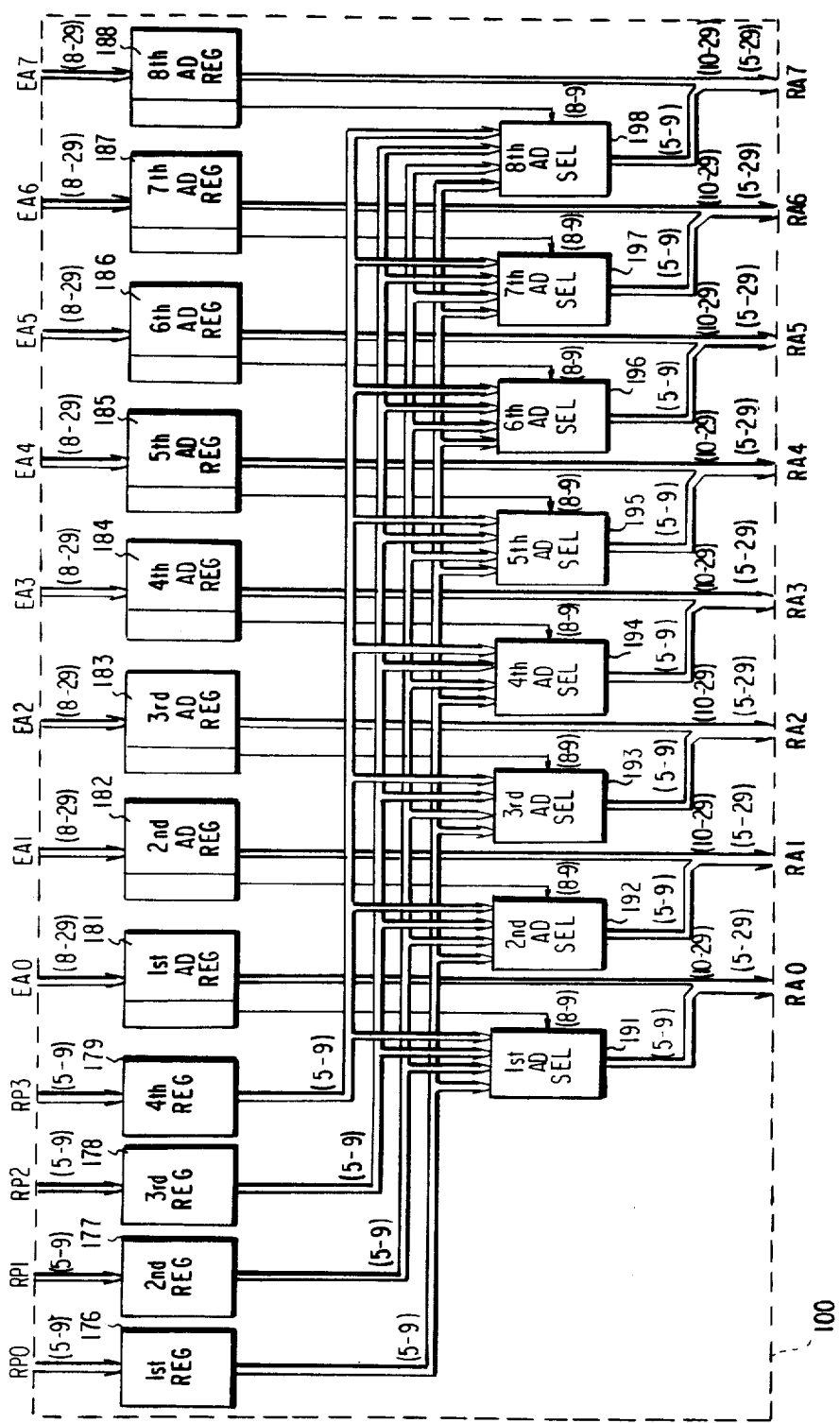
FIG. 13 shows a block diagram of an address combination circuit for use in the data processing system illustrated in FIG. 9.

Referring to FIG. 13, the address combination circuit 100 comprises first through fourth address registers (REG) which are indicated at 176 to 179 and which are to be loaded with the first through the fourth real page addresses $RP_0$ to $RP_3$, respectively. The first through the eighth local addresses $EA_0$ and $EA_7$ are kept in first through eighth additional registers (AD REG) 181 to 188, respectively. The first through the fourth address registers 176 to 179 are connected to each of first through eighth additional selectors (AD SEL) 191 to 198 each of which is controlled by two higher bits of each local logical address $EA_0$ to $EA_7$.

The illustrated address combination circuit 100 is operable in a manner similar to that illustrated in conjunction with FIG. 8 except that the first through the fourth real page addresses $RP_0$ to $RP_3$ are selected by the two higher bits of the local logical addresses $EA_0$ to $EA_7$ and the first through eighth local real addresses $RA_0$ to $RA_7$ are supplied to the memory access controller 135 (FIG. 9). Accordingly, operation of the address combination circuit 100 will not be described any longer.

In FIG. 9, the memory access controller 135 selects eight, four, two or one of the first through the eighth local real addresses $RA_0$ to $RA_7$ in response to the element number signal NB to send the selected local real addresses as the specific addresses to the memory 32.

It is possible to simultaneously read a plurality of data elements in response to the specific addresses when the memory 32 is divided into a plurality of areas individually accessible by the specific addresses.

While this invention has thus far been described in conjunction with a few embodiments thereof, it will readily be possible for those skilled in the art to put this invention into practice in various other manners. For example, logical and real address spaces and address translation method are not restricted to the exemplified spaces and method. The number of the specific addresses concurrently sent to the memory 32 may be changed from each of the exemplified numbers to the other number. The element number may be decided in each cycle with reference to a leading one of the logical addresses that is determined in each cycle, although the element number is assumed to be constant at each sequence.

What is claimed is:

1. A data processing system for use in accessing in each cycle a memory which has a plurality of real addresses located in a real address space and which stores a plurality of sequence of data elements, the data elements of each sequence being stored in the real addresses equidistantly spaced apart from one another in said real address space by a real distance which is representative of an address distance between two adjacent ones of the real addresses for each sequence and which is predetermined for each sequence, said data processing system comprising:

logical address specifying means (36) for identifying a preselected one of logical addresses of a logical address space in each cycle that corresponds to a preselected one of the data elements of each sequence;

a distance specifying means (37) for identifying the logical distance that corresponds to the real distance between data elements of each sequence in each cycle;

deciding means (40) coupled to said distance specifying means and responsive to said logical distance for determining an element number which is the number of data elements to be simultaneously read out for each sequence;

address calculating means (50, 80, 100, 135) coupled to said deciding means, said distance specifying means and said logical address specifying means, and responsive to said preselected logical address, said logical distance, and said element number for calculating the specific addresses of a number of data elements which together equal in number said element number and are spaced apart from one another by the real distance which corresponds to said logical distance and which include a preselected real address for storing said preselected one of the data elements as a leading data element; and means coupled to said address calculating means and responsive to said specific addresses for accessing said memory to produce those of the data elements of each sequence in each cycle including said preselected one of the data elements which in the aggregate equal in number said element number.

2. A data processing system as claimed in claim 1, said memory comprising a plurality of consecutively numbered real pages with each real page subdivided into a plurality of memory locations, each of said real addresses consisting of a real page address and a real internal address, the real page addresses identifying the respective real pages, the real internal addresses identifying the respective memory locations of each real page, said logical address space comprising a plurality of logical pages with each logical page subdivided into logical positions equal in number to the memory locations of each real page, each of said logical addresses consisting of a logical page address and a logical internal address, the logical page addresses specifying the respective logical pages, the logical internal addresses specifying the respective logical positions of each logical page, said preselected logical address consisting of a preselected logical page address and a preselected logical internal address, wherein said address calculating means comprises:

address translation means for translating said preselected logical page address into translated real page addresses which are used in accessing those at least two of said real pages, one of said at least two real pages being accessible by said preselected real page address, the remaining at least one of said at least two real pages having the real page address numbered consecutive to said one of said at least two real pages;

address generating means responsive to said preselected logical page address and said preselected logical internal addresses and said logical distance for generating a predetermined number of local logical addresses one of which is identical with at least a part of a combination of said preselected logical page address and said preselected logical internal address and remaining ones of which are spaced apart by integral multiples of said logical distance from the logical position specified by said preselected logical page and said preselected logical internal addresses;

address combining means for combining said translated real page addresses with said local logical addresses to produce local real addresses which are equal in number to said predetermined number and which correspond to said local logical addresses, respectively; and selecting means responsive to said local real addresses and said element number for selecting said specific addresses from said local real addresses.

3. A data processing system as claimed in claim 2, wherein said address generating means comprises:

supplying means responsive to said preselected logical page address and said preselected logical internal address for supplying at least a part of said preselected logical address to said combining means as said one local logical address;

calculation means responsive to said logical distance for calculating integral multiples of said logical distance which are equal in number to said predetermined number less one; and summing means for summing said integral multiples and said at least a part of the preselected logical address to supply the remaining local logical addresses to said combining means.

4. A data processing system as claimed in claim 2, said logical pages being equal in number to two in the X-th power, each logical page address being of X bits where X is an integer, said X bits being divisible into a higher significant part of M bits and a lower significant parts of N bits, said logical pages being divided into logical page blocks which are equal in number to two to the N-th power and each of which consists of the logical pages equal in number to two to the M-th power, the higher significant part of said each logical address being further divided into a first part and a second part following the first part wherein said address translation means comprises:

translation buffers, two to the N-th power in number, which correspond to the respective logical page blocks for carrying out address translation for each of said logical page blocks, each of said translation buffers storing the first parts of the logical page addresses for each logical page block together with said translated real page addresses for the respective logical page addresses; and buffer accessing means coupled to said logical address specifying means for accessing the respective translation buffers by using said second part of said preselected logical page address to make said translation buffers produce the translated real page addresses corresponding to said preselected logical page address.

5. A data processing system as claimed in claim 3, the preselected logical address being stored at a leading logical address in a current one of the cycles in said logical address specifying means, wherein said calculation means further calculates a product of said logical distance and said predetermined number;

said address generating means further comprises:

additional means coupled to said calculation means and said logical address specifying means for adding said product to said leading logical address in said current cycle to produce a result of addition; and means for supplying said result of addition to said logical address specifying means as the preselected logical address used in a cycle following said current cycle.

* * * * *

UNITED STATES PATENT AND TRADEMARK OFFICE
CERTIFICATE OF CORRECTION

PATENT NO. : 4,691,281
DATED : September 1, 1987
INVENTOR(S) : FURUI

It is certified that error appears in the above-identified patent and that said Letters Patent is hereby corrected as shown below:

| | |
|---|---|
| COLUMN 1, LINE 16 | After "array" insert --namely-- |
| COLUMN 3, LINE 20 | After "1" delete "." insert --,-- |
| COLUMN 4, LINE 21 | After "event" insert --,-- |
| COLUMN 4, LINE 48 | After "consists" delete "oof" insert --of-- |
| COLUMN 11, LINE 27 | Delete "numer" insert --number-- |
| COLUMN 12, LINE 5 | Delete "$D_0$" insert --$D_{(0)}$-- |
| COLUMN 12, LINE 21 | Delete "fouth" insert --fourth-- |
| COLUMN 20, LINE 54 | Delete "at" insert --as-- |

Signed and Sealed this

Twelfth Day of July, 1988

Attest:

DONALD J. QUIGG

*Attesting Officer*     *Commissioner of Patents and Trademarks*